United States Patent Office 3,420,938
Patented Jan. 7, 1969

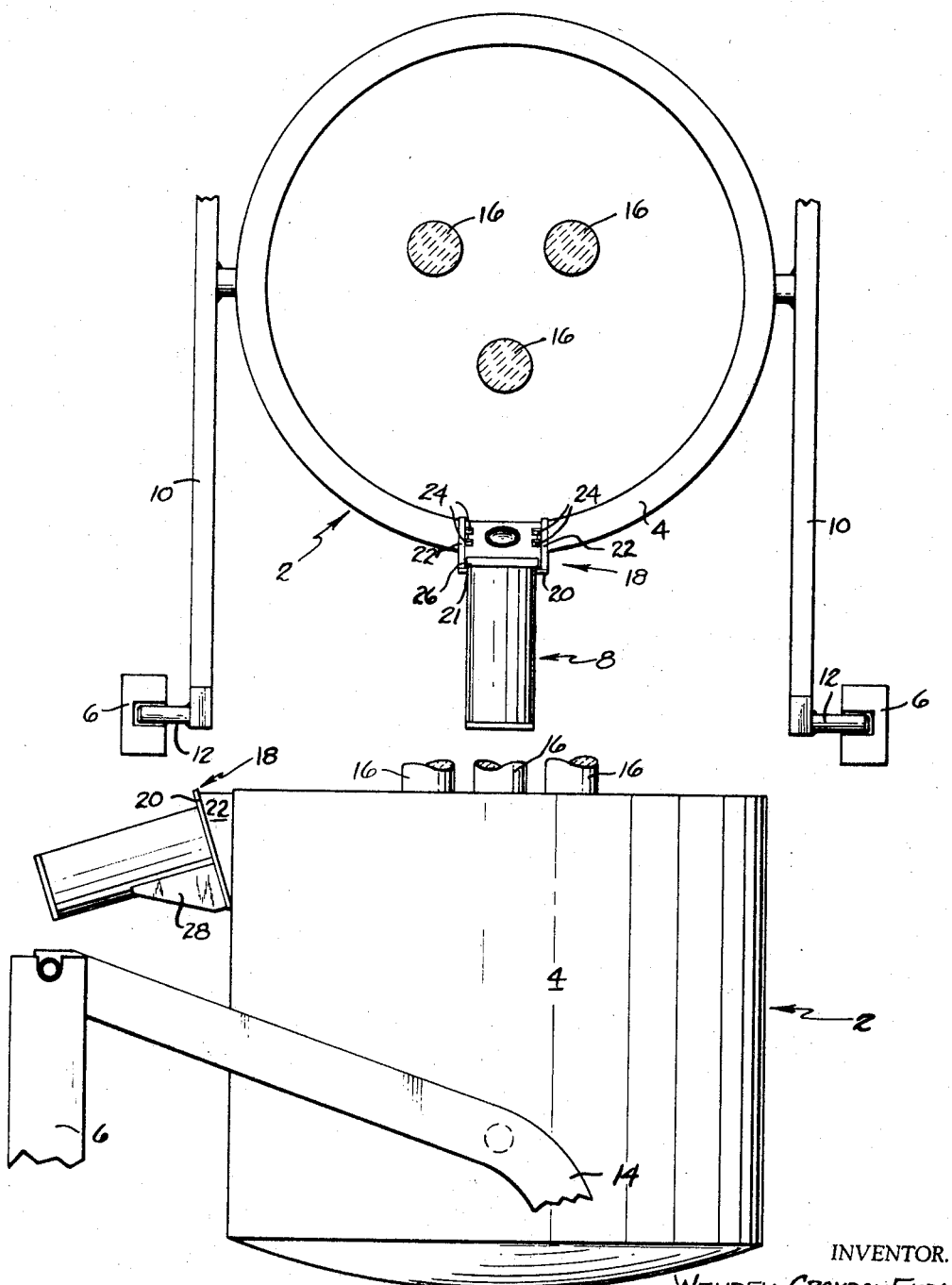

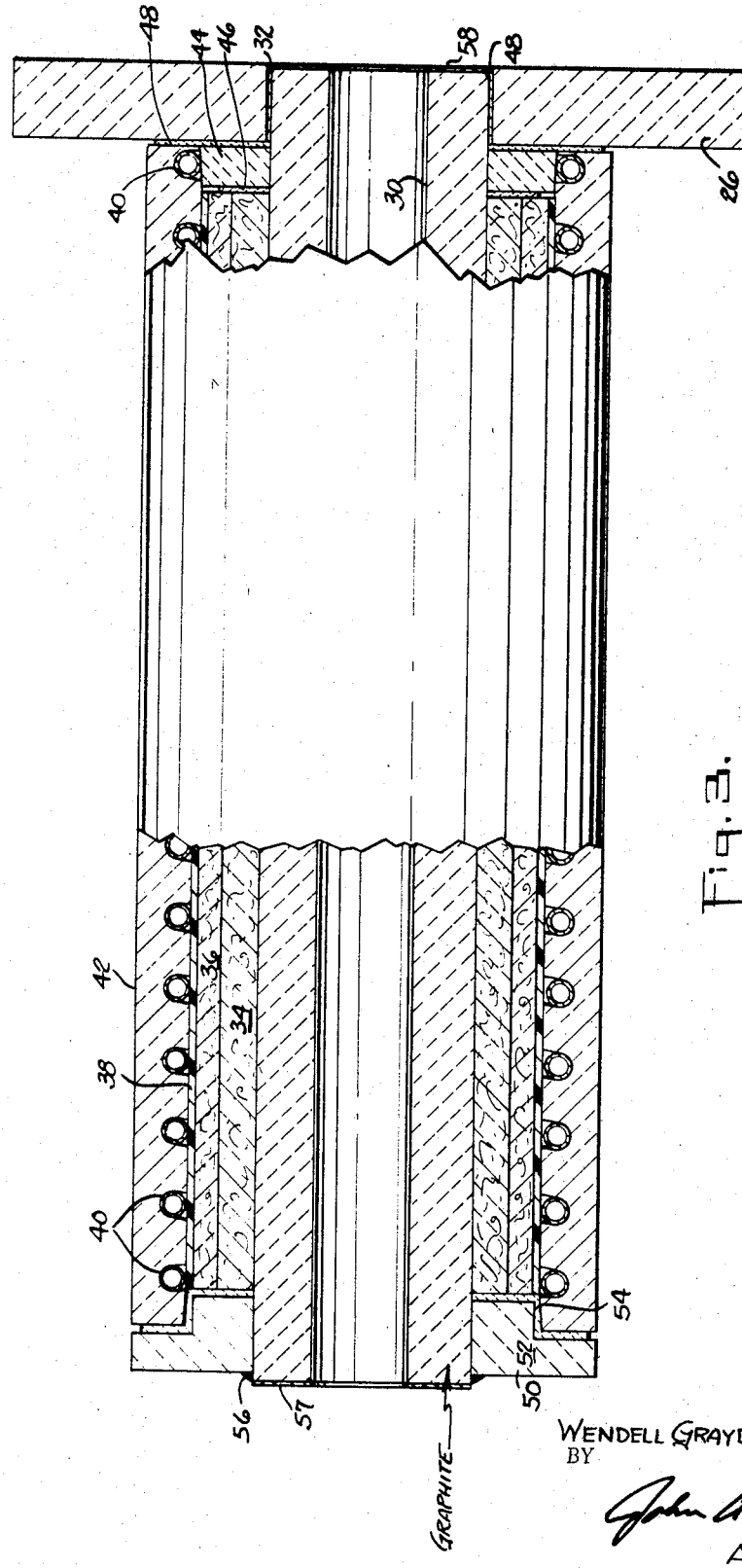

3,420,938
APPARATUS FOR DELIVERING MOLTEN MATERIALS
Wendell Graydon Ekdahl, Martinsville, N.J., assignor to Johns-Manville Corporation, New York, N.Y., a corporation of New York
Filed June 23, 1965, Ser. No. 466,358
U.S. Cl. 13—9          5 Claims
Int. Cl. H05b 7/18; H05b 5/00

ABSTRACT OF THE DISCLOSURE

An induction heated pouring spout of a heated melting vessel has an induction heating coil encased in a ceramic cylinder. A graphite cylinder is disposed within and concentric to the graphite cylinder which conveys molten materials and is the susceptor for the coil.

---

This invention relates to apparatus for delivering inorganic materials, particularly inorganic refractory materials having a high melting point, from a suitable melting vessel over a relatively large distance for further processing. More specifically, the invention relates to apparatus for releasing a continuous stream of molten inorganic refractory materials at a sustained rate from the melting vessel with no solidification in the conveying elements.

The most common methods for releasing a stream of molten material from a melting vessel are through a channel which varies in length from several inches to nearly two and one-half feet or over a weir block. These methods are not satisfactory since the material tends to solidify and finally to reach a stage of solidification terminating all flow. During the period when the melt is freezing or solidifying in the channel or weir block, it is not possible to deliver a stream of molten material at a sustained rate to a prescribed fixed location for further processing. Also, the temperature of the delivered molten material varies in relation to the solidification in the channel or weir block. In many instances, the material loss due to the solidification and to the inefficiencies produced thereby in the future processing steps amounts to between about 40 to 60% of the total material poured. The control of the flow rate is increasingly important when relatively small amounts of material are being conveyed through the channel or over a weir block. This is because there is less heat present and, therefore, a greater tendency for the molten materials to solidify. Apparatus utilizing electrical-resistance heaters, gas-air heaters and oxygen-acetylene heaters have been tried to deliver a continuous stream of molten material over a relatively large distance at essentially a uniform rate without success.

It is an object of the instant invention to provide apparatus for delivering a continuous stream of molten inorganic refractory materials from a melting vessel at a sustained rate.

The foregoing object is accomplished in accordance with the instant invention by an induction heated pouring spout which is attached to the wall of a melting vessel. In the preferred embodiment of the invention, the pouring spout comprises a graphite cylinder which is encased in suitable insulation and is held in place within an induction heating coil which coil is imbedded in a ceramic cylinder to provide mechanical support for the induction heating coil and the assembled pouring spout. The graphite cylinder functions as the conveying medium for the molten inorganic refractory material and as a susceptor for the induction heating coil.

The invention will be more fully understood and further objects and advantages thereof will become apparent when reference is made to the following detailed description of a preferred embodiment of the invention and the accompanying drawing in which:

FIG. 1 is a top plan view of the apparatus of the present invention;
FIG. 2 is a side elevation of FIG. 1; and
FIG. 3 is a view particularly in cross-section of the pouring spout of the present invention.

Referring to the drawing and particularly to FIGS. 1 and 2, there is illustrated a melting vessel or furnace 2 comprising a metal shell 4. A pair of bearing mounts 6 are located in fixed position adjacent the melting vessel 2 so that the axis of rotation of the bearing mounts passes through the tip of the pouring spout 8 positioned on the melting vessel 2. Attached in a fixed position on the metal shell 4 on opposite sides of the melting vessel 2 are a pair of arms 10 having pins 12 at each end thereof which are mounted for pivotal movement in the bearing mount 6. Each arm 10 has an extension 14 which is secured to any conventional means, such as a hydraulic cylinder and piston arrangement (not shown), for tilting the melting vessel 2.

Projecting downwardly into the melting vessel 2 are primary electrodes 16 preferably three in number and connected in a three-phase electric circuit. All of the electrodes are preferably supported to tilt with the furnace by any conventional means, several of which should be obvious to any skilled mechanic. Also, the electrodes should be vertically adjustable in accordance with conventional practice so that the electrodes may always be made to penetrate the molten material in the melting vessel to the proper depth.

The pouring spout 8 is attached to the melting vessel 2 with no forehearth being required. A notch is cut in the metal shell 4 adjacent the upper edge thereof and a saddle 18, secured therein. The saddle 18 has an inclined surface plate 20 which can be set at an angle from about 20° above the horizontal to about 60° below the horizontal, the angle depending upon the process requirements and upon the quantity of molten material to be poured from the furnace. In the preferred embodiments of the invention, this angle is between horizontal and 15° below horizontal. The plate 20 has a central notch 21 for receiving the cylindrical portion of the pouring spout 8. The plate 20 in the embodiment illustrated in FIGS. 1 and 2 is set at an angle of about 15° below the horizontal. Attached to each of the side walls 22 of the saddle 18 are a pair of pins 24 which cooperate with the plate 20 to form slots for receiving the backer plate 26 of the pouring spout 8. The saddle 18 is further provided with a support 28 on which a portion of the outer surface of the pouring spout 8 is supported. The saddle 18 in the preferred embodiment of the invention comprises non-magnetic stainless steel in order to minimize energy losses from the magnetic field set up by the induction heating coil.

The pouring spout 8 is illustrated particularly in FIG. 3. As described above, the backer plate 26 is inserted between the pins 24 and the plate 20 until the outer surface of the pouring spout 8 rests in the support 28. A hollow cylinder 30 is received in an opening 32 in the backer plate 26. The cylinder 30 functions as the conveying medium for the molten refractory material being poured from the melting vessel 2 and also as the susceptor for the induction heating system as explained below. In the preferred embodiment of the invention, the cylinder 30 comprises a suitable form of graphite. Surrounding the cylinder 30 but extending in an axial direction a distance less than the axial extent of the cylinder 30 is a thickness of insulating material 34 which must be capable of withstanding temperatures as great as 3800° F. A fibrous insulating material which will perform satisfactorily in this service is a graphite or carbon insulating felt. Surrounding the thickness of insulating material 34 is another thickness of insulating material 36 which for this service may comprise a refractory fiber insulating material since the temperature environment at this location is less severe than the temperatures encountered by the insulating material 34. These insulating materials 34 and 36 are encased in a high temperature mica sheet 38. The mica sheet 38 functions to restrict carbon migration to the adjacent induction heating coil and to provide airtightness for the insulation system. Surrounding the mica sheet 38 is an induction heating coil 40 encased in a ceramic cylinder 42. The ceramic cylinder 42 extends in an axial direction a distance greater than the axial extent of said insulating materials 34 and 36 but less than the axial extent of said graphite cylinder 30.

To provide maximum protection for the insulating materials 34 and 36 and the cylinder 30, it is necessary that the connection of the pouring spout 8 to the melting vessel 2 be both airtight and liquid tight and that the discharge end of the pouring spout 8 be airtight. Liquid tightness is required to prevent the molten material from attacking the insulation and the induction heating coil while airtightness is required to prevent combustion of the carbonaceous insulating material. The gasket 44 extends between and contacts the inner peripheral surface of the ceramic cylinder 42 and the outer peripheral surface of the graphite cylinder 30. A suitable inorganic refractory fiber cement 46 and 48 is used to seal the gasket to the axial extremities of the insulating materials and also to seal the gasket 44, the ceramic cylinder 42 to the backer plate 26 and the cylinder 30 to the opening 32 in the backer plate 26. Adjacent the other axial extremities of the insulating materials 34 and 36, there is a ring-shaped end seal block 50 surrounding the cylinder 30. A projection 52 on the block 50 extends axially inwardly and bridges the gap between the inner peripheral surface of the ceramic cylinder 42 and the outer peripheral surface of the cylinder 30. The space between the axially inner surface of the block 50 and the axial extremity of the ceramic cylinder 42 and the space between the axially inner surface of the projection 52 and the axial extremities of the insulating materials 46 and 48 is sealed by filling the space with a suitable refractory fiber cement 54. Thus, the invention provides fluid and airtight seals for the pouring spout 8. The axial extremity 56 of the cylinder 30 is sealed to the block 50 and the surfaces 57 and 58 thereof are painted with a refractory fiber cement.

The induction heating coils 40 are connected to an electric generator of the type conventionally utilized with an induction heating system. The power equipment requirements depend upon the insulation system with respect to heating efficiencies. High generator output capacity combined with an effective insulation system will permit rapid initial heating up to temperatures of about 3800° F. at a rate in excess of 100° F. per minute. Output frequencies from about 3000 to 4200 have been found satisfactory, but the satisfactory frequency range can probably be extended in both directions. In order to operate the system, it is merely necessary to turn the power on full until the temperature of the graphite cylinder 30 reaches a satisfactory level. Power input is then reduced until stability at the desired temperature is obtained. For the particular inorganic refractory material used in the preferred embodiment of this invention, the temperature of the graphite cylinder 30 should be slightly greater than 3400° F.

In one application of the inventive concepts of the instant application, the pouring spout 8 comprises a graphite cylinder 30 having a length of 27¼", an outside diameter of 4½" and an inside diameter of 2". The insulating material 34 comprises a plurality of laminations of a graphite felt having a radial thickness of ¾" with the inner surface of the insulating material 34 being in contact with the outer peripheral surface of the graphite cylinder 30. The insulating material 36 comprised a refractory fiber insulating felt having a radial thickness of about ½" with the inner peripheral surface of the insulating material 36 being in contact with the outer peripheral surface of the insulating material 34. The mica sheet 38 was in contact with the outer peripheral surface of the insulating material 36 and comprised a high temperature mica having a radial thickness of $\frac{1}{16}$". The induction heating coil comprised a 15-turn helix of ½" diameter copper pipe with suitable connections for electric power and water coolant and wherein the coil was imbedded in a ceramic cylinder 42 comprising a castable cement with temperature capability to at least 700° F. and preferably to at least 2000° F. The induction heating coil 40 was connected to an electric generator having a capacity of 30 k.v.a. at 4.2 kilocycles. The induction heating coil 40 was energized so as to provide sufficient energy so that the temperature of the graphite cylinder 30 which acts as the susceptor of the induction heating system would be raised to about 3400° F. Suitable inorganic refractory materials were melted in the melting vessel 2 which was then tilted at the proper angle to pour the molten inorganic refractory materials through the graphite cylinder 30 of the pouring spout 8 at a flow rate of approximately 1600 to 1800 lbs. per minute. The flow of the molten inorganic refractory materials out of the pouring spout 8 was directed to fall on a conventional fiberizing system (not shown) to convert the molten material into refractory fibers. The pouring spout functioned properly so that nearly 100% of the material melted in the melting vessel was delivered to the fiberizing system. Experiences in the past using the same equipment but with conventional pouring spouts usually had an efficiency of a nature wherein only about 40 to 60% of the material melted in the melting vessel 2 was conveyed to the fiberizing system.

In the foregoing explanation, the cylinder 30 comprised a graphite material, but it is to be understood that this cylinder could be made from any type of material that will also function as a susceptor for an induction heating system. These materials include zirconia, zirconium diboride, irridium, molybdenum, KT silicon carbide and or other similar materials possessing the required high temperatures and electrical properties. Also, other types of insulating materials and cements may be utilized as long as such materials can perform in these surroundings. Also, it is to be noted that the apparatus of the instant invention is particularly useful in sustaining a steady flow of molten material at a relatively low flow rate. Thus, it is desirable in some instances that the molten material flows at rates of approximately 600 pounds per hour. In these instances, the apparatus of the instant invention operates to maintain the flow rate at the desired rate.

While the invention has been described in rather full detail, it will be understood that these various changes and modifications may suggest themselves to one skilled in the art, all falling within the scope of the invention as defined by the subjoined claims.

What I claim is:
1. Apparatus comprising:
  (a) a heated melting vessel containing a supply of molten refractory materials,
  (b) an induction heated pouring spout attached to said vessel and through which said molten refractory materials may be delivered at a sustained rate for further processing,
  (c) an induction heating coil encased in a ceramic cylinder,
  (d) a graphite cylinder within and concentric to said induction heating coil wherein said graphite cylinder conveys said molten materials and is the susceptor for said induction heating coil, and
  (e) insulating material positioned between said ceramic cylinder and said graphite cylinder.

2. Apparatus comprising:
(a) a heated melting vessel containing a supply of molten refractory materials,
(b) an induction heated pouring spout attached to said vessel and through which said molten refractory materials may be delivered at a sustained rate for further processing,
(c) an induction heating coil encased in a ceramic cylinder,
(d) a graphite cylinder within and concentric to said induction heating coil wherein said graphite cylinder conveys said molten materials and is the susceptor for said induction heating coil,
(e) a graphite felt positioned between said graphite cylinder and said ceramic cylinder to provide insulation therefor, and
(f) means for preventing fluid flow to said graphite felt.

3. Apparatus comprising:
(a) a melting vessel containing a supply of inorganic refractory materials,
(b) means for melting said inorganic refractory materials while in said melting vessel,
(c) an induction heated pouring spout attached to said melting vessel and through which said molten refractory materials may be delivered at a sustained rate for further processing comprising:
  (1) an induction heating coil encased in a ceramic cylinder,
  (2) a graphite cylinder within and concentric to said induction heating coil wherein said graphite cylinder conveys said molten materials and is the susceptor for said induction heating coil,
  (3) a graphite felt positioned between said graphite cylinder and said ceramic cylinder to provide insulation therefor, and
  (4) means for preventing fluid flow to said graphite felt.

4. Apparatus as defined in claim 3 wherein:
(a) said induction heated pouring spout is attached to said melting vessel at an angle between about the horizontal and 15° below the horizontal.

5. Apparatus as defined in claim 4 wherein:
(a) said graphite cylinder is at a temperature between about 3200° F. and 3600° F.

References Cited

UNITED STATES PATENTS

| | | | |
|---|---|---|---|
| 1,652,409 | 12/1927 | Moulthrop | 222—146 |
| 2,904,664 | 9/1959 | Rothacker | 219—10.5 X |
| 3,210,455 | 10/1965 | Sedlatschek | 219—10.5 X |
| 2,186,718 | 1/1940 | Ferguson. | |
| 2,754,346 | 7/1956 | Williams | 13—5 |
| 2,937,789 | 5/1960 | Tama | 13—33 X |

FOREIGN PATENTS 1,079,924  12/1954  France.

BERNARD A. GILHEANY, *Primary Examiner.*

H. B. GILSON, *Assistant Examiner.*

U.S. Cl. X.R.

13—26